(12) United States Patent
Sutton et al.

(10) Patent No.: US 6,504,710 B2
(45) Date of Patent: Jan. 7, 2003

(54) METHOD OF INTERCONNECTING OF A HAND-HELD AUXILIARY UNIT, A PORTABLE COMPUTER AND A PERIPHERAL DEVICE

(75) Inventors: John Sutton, Hurst, TX (US); Danile E. Swindler, Austin, TX (US); Brian Groh, Glen Morris (CA); Richard Perley, Oakville (CA); Glen Clifton, Austin, TX (US)

(73) Assignee: Xplore Technologies Corp., Mississauga (CA)

( * ) Notice: Subject to any disclaimer, the term of this patent is extended or adjusted under 35 U.S.C. 154(b) by 0 days.

(21) Appl. No.: 10/046,604

(22) Filed: Jan. 16, 2002

(65) Prior Publication Data

US 2002/0078291 A1 Jun. 20, 2002

Related U.S. Application Data

(63) Continuation of application No. 09/200,805, filed on Nov. 27, 1998, now Pat. No. 6,426,872.

(51) Int. Cl.[7] ............................................... G06F 1/16
(52) U.S. Cl. .................. 361/686; 361/683; 361/727; 364/708.1; 312/223.1
(58) Field of Search ............................... 361/686, 683, 361/679, 724, 727; 439/76.1, 131, 135, 136, 626, 638, 928.1; 235/472, 462; 312/223.1, 223.2; 364/708.1; 307/9.1–10.6; 297/188.01, 188.2; 224/275, 929

(56) References Cited

U.S. PATENT DOCUMENTS 4,969,830 A * 11/1990 Daly et al. .................. 439/136
5,347,115 A * 9/1994 Sherman et al. ............. 235/472
5,475,441 A * 12/1995 Parulski et al. .............. 348/552
5,555,491 A * 9/1996 Tao ............................. 361/686
5,644,471 A * 7/1997 Schultz et al. ............... 361/686
5,805,416 A * 9/1998 Friend et al. ................ 361/686
5,825,617 A * 10/1998 Kochis et al. ............... 361/686
5,966,285 A * 10/1999 Sellers ........................ 361/686
6,020,654 A * 2/2000 Chutorash ................... 307/10.1
6,289,213 B1 * 9/2001 Flint et al. ................... 455/420

* cited by examiner

Primary Examiner—Darren Schuberg
Assistant Examiner—Michael Datskovsky
(74) Attorney, Agent, or Firm—Much Shelist

(57) ABSTRACT

A pen-based portable computer, or pen-tablet computer, for use with a vehicular docking station that allows for the exchange or replacement of components thereof without the need for returning the computer to the manufacturer. The computer utilizes a main or primary housing for the major components of the computer, and a separate, independent, auxiliary expansion unit having its own housing for mounting a replaceable radio module that is connected to the main computer via a multi-pin connector, whereby the replacement or exchange of the radio module for a different one is easily and readily achieved, and where auxiliary or expansion devices may be connected to the main computer thereby, and where the auxiliary device itself serves as a handle for holding the main computer. Also provided is a vehicular docking station for the combined main computer and auxiliary unit, which vehicular docking station is provided with a multi-pin connector for receiving thereby a multi-pin connector of the auxiliary unit when the computer is connected to the auxiliary unit.

3 Claims, 10 Drawing Sheets

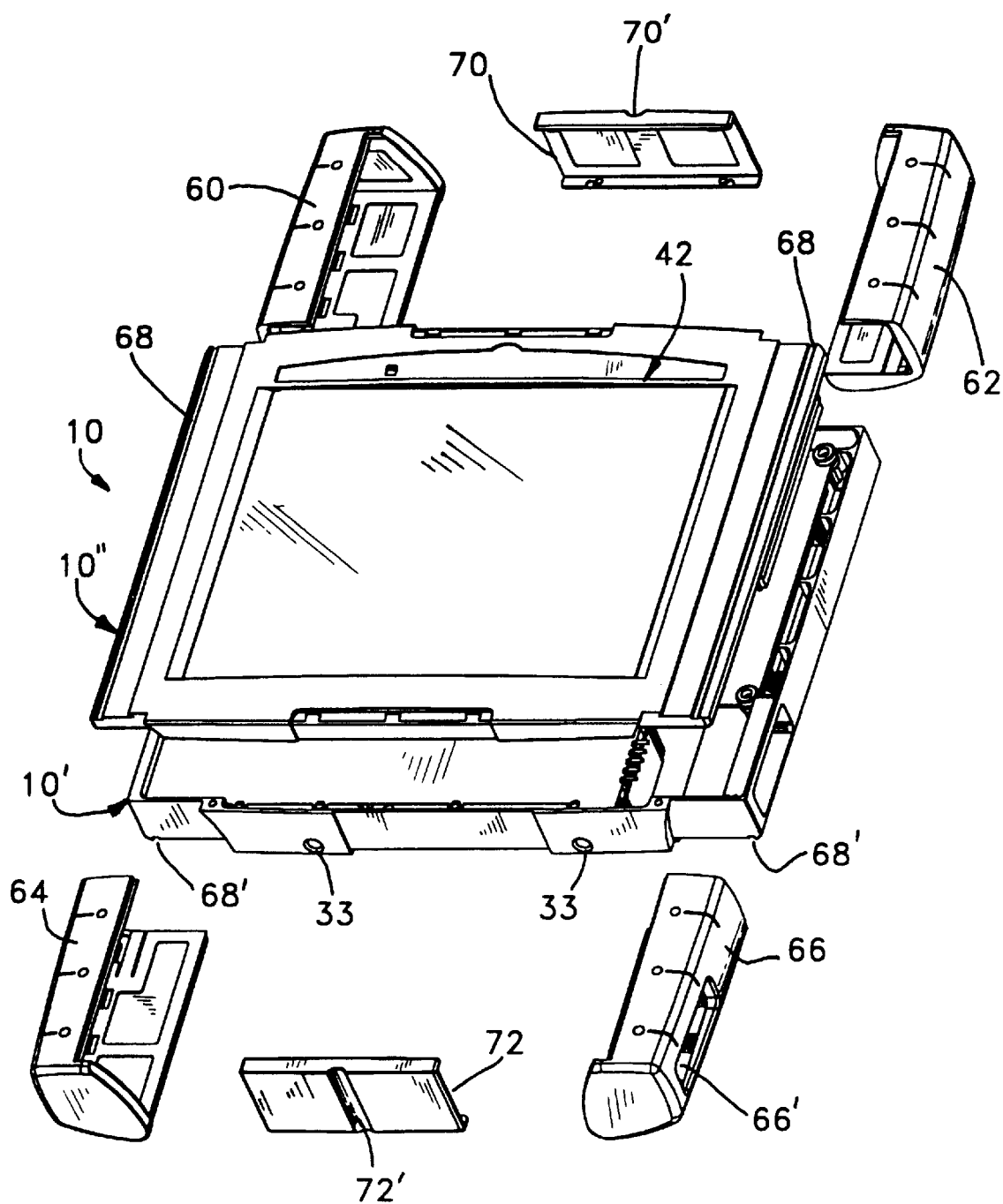

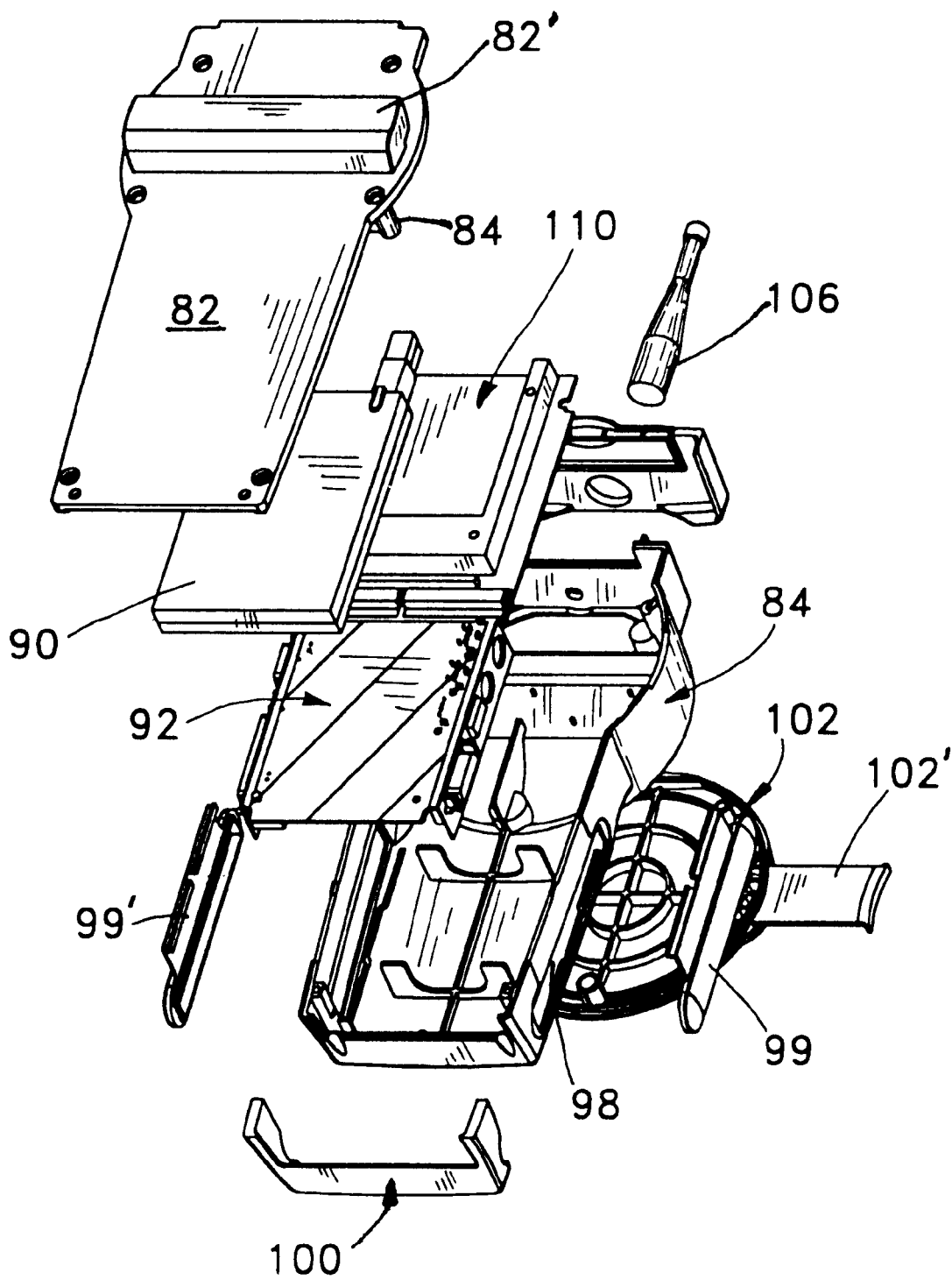

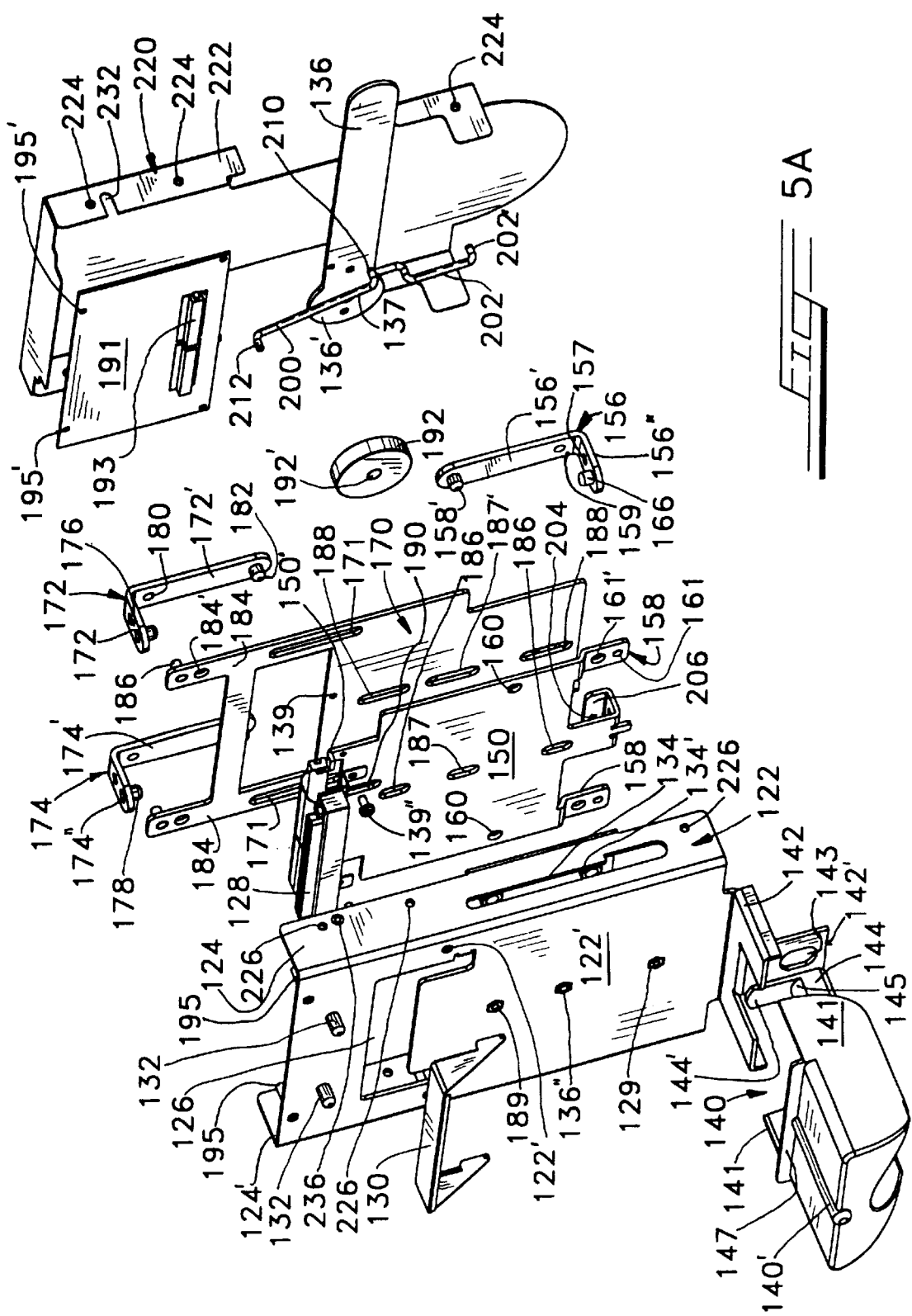

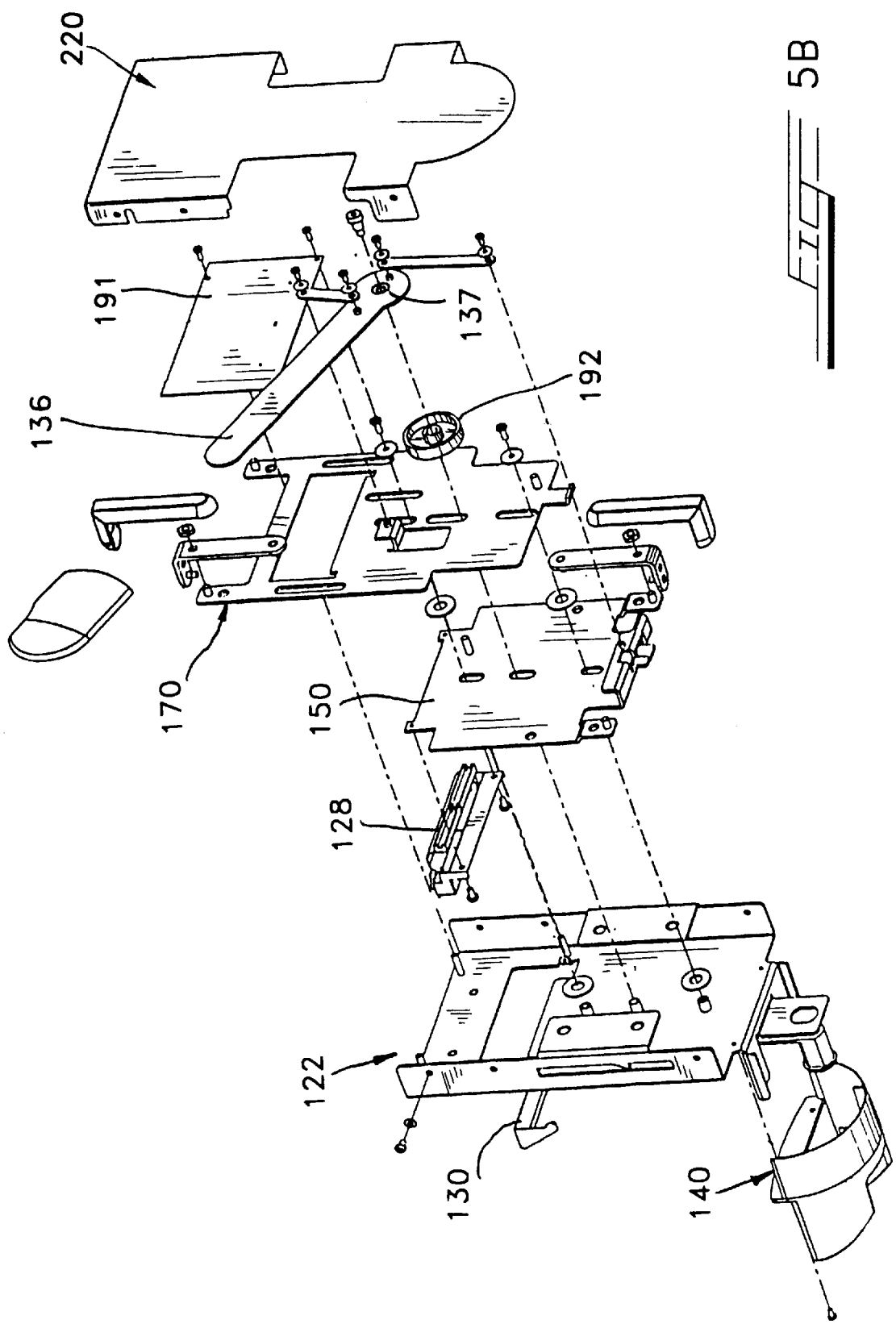

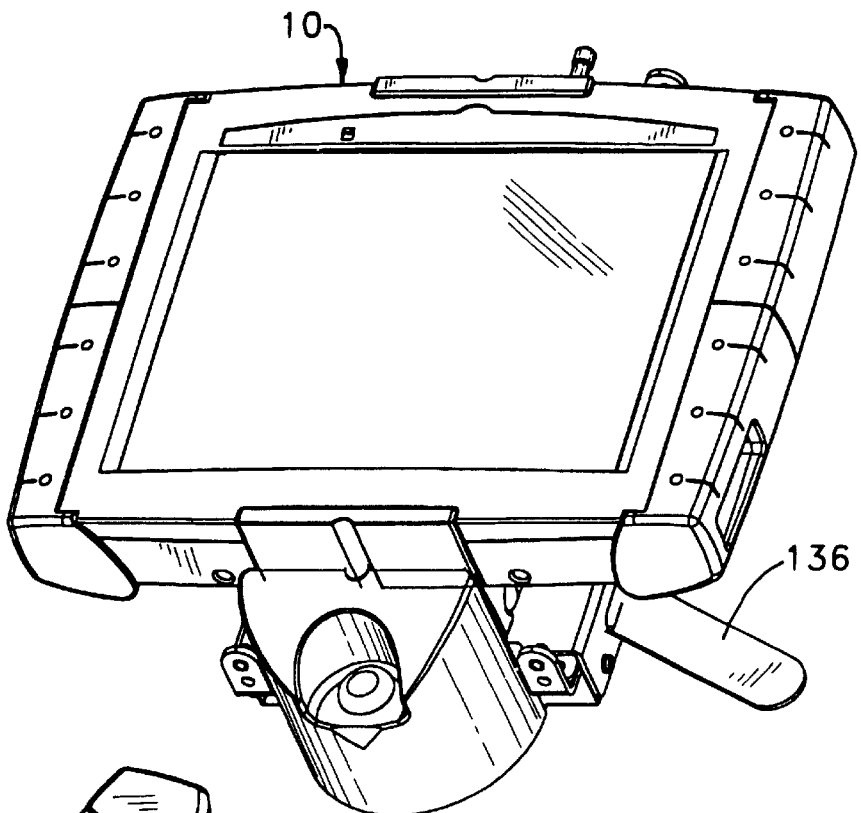
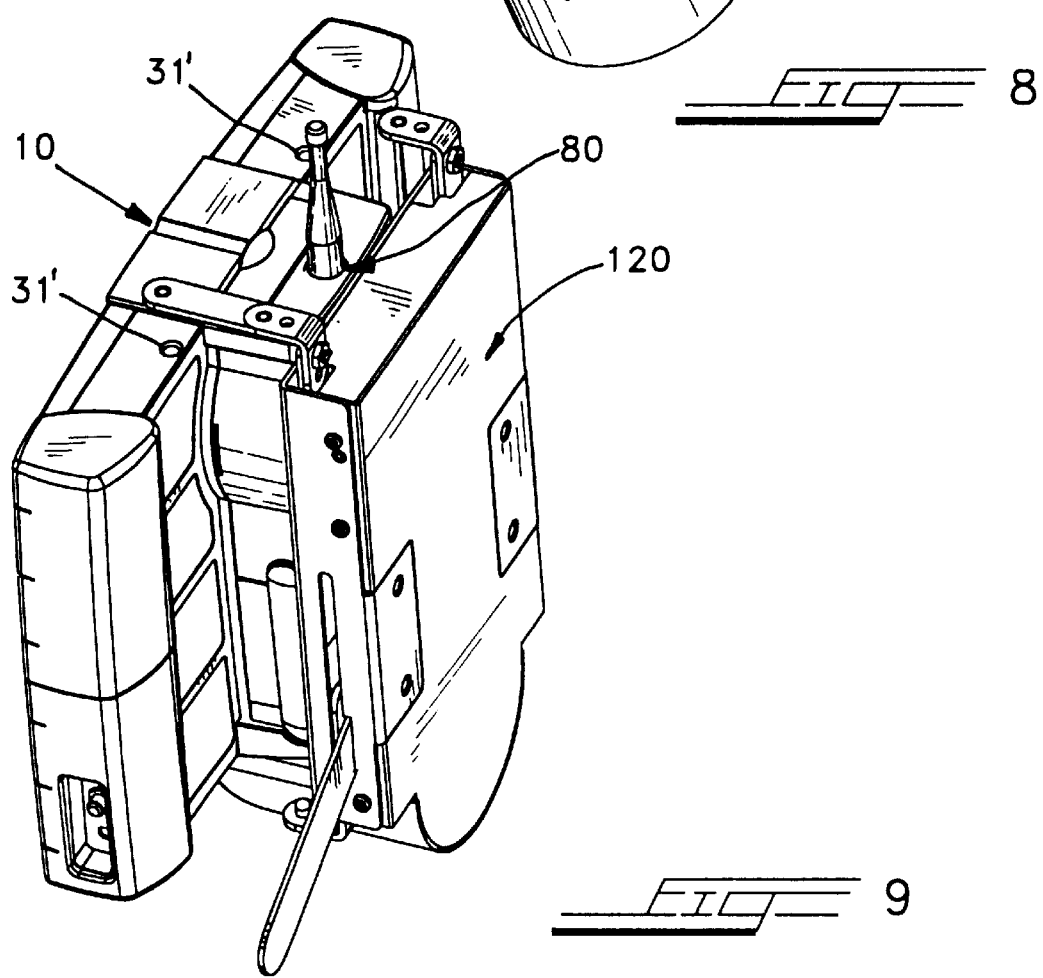

METHOD OF INTERCONNECTING OF A HAND-HELD AUXILIARY UNIT, A PORTABLE COMPUTER AND A PERIPHERAL DEVICE

CROSS REFERENCE TO RELATED APPLICATIONS

This application is a continuation of application Ser. No. 09/200,805, filed Nov. 27, 1998 now U.S. Pat. No. 6,426,872.

BACKGROUND OF THE INVENTION

The present invention is directed to a portable, pen-based computer for use in a vehicle, or what is typically called "Pen Tablet Computer". Portable, pen-based computers are currently used in the utility industry by salesmen and representatives. A pen-based computer is desirable in the utility industry since the software typically used are forms that must be filled; thus, the easiest and simplest way for the salesman or representative to complete the form is by means of a pen stylus device and/or by touch, such as a touch screen. Any industry where its representatives typically use forms-software that must be filled out is capable of using the pen-based computer, such as the public-safety departments of cities and states, the agricultural and transportation industries, and insurance adjusters.

Presently-used pen-based computers for vehicles are typically provided with wireless radio modems, such as RAM, ARDIS, CDPD, etc., by which the forms or the like filled out may be sent to a home base, and the like. These prior-art systems are also provided with PCMCIA slots for expansion cards. Some prior-art systems have a vehicular mounting system to which the pen-based computer is docked while in the vehicle, allowing ease of use of the computer, as well as offering a number of auxiliary devices, such as a battery charger, hard drive, CD-ROM, radio transceiver, etc. One serious problem with these prior-art systems is that they lack the possibility of changing radio systems, such as upgrading to a wireless WAN/LAN, for example. To upgrade, one must return the entire, sealed computer to the manufacturer, who then performs an internal upgrade to the OEM radio transceiver inside of the computer. Alternatively, the PC-card slot could be used, but this requires the use of more expensive PC-cards rather than use of less-expensive OEM radio modules. Moreover, the PC-card is exposed to ambient conditions, whereas the OEM radio is sealed and protected inside the computer. The same problem exists when one wishes to upgrade the processor, the entire computer must be sent back to the manufacturer.

As mentioned above, the prior-art pen-based, portable computers provide a vehicular mounting system to which the computer is docked while in the vehicle. These vehicular mounting, or docking, systems are typically "dumb", and are a single piece of metal or plastic tube which is mounted to the cowl or floor of the vehicle and extends upwardly to a meet a mounting platform at the top, to which is docked the computer via manual drop-and-click locking mechanism. There is no assurance that proper mechanical and electrical connection between the portable computer and the mounting platform has been successfully achieved until one attempts to use computer. It is not uncommon for these connections to be faulty or inadequately effected, thus necessitating the user to perform the docking task one or more times.

The pen-based portable computer of the invention overcomes all of the above-described shortcomings of the prior art, and provides a number of beneficial and novel additions that provide a pen-based portable computer that is more reliable, easier to use, and which provides for the possibility of exchanging components without having to return to the computer to the manufacturer.

SUMMARY OF THE INVENTION

It is the primary objective of the present invention to provide a pen-based portable computer, or pen-tablet computer, for use with a vehicular docking station that allows for the exchange or replacement of components thereof without the need for returning the computer to the manufacturer.

It is another objective of the present invention to provide a portable, pen-tablet computer that utilizes a main or primary housing for the major components of the computer, and a separate, independent, auxiliary expansion unit having its own housing for mounting a replaceable radio module that is connected to the main computer via a multi-pin connector, whereby the replacement or exchange of the radio module for a different one is easily and readily achieved, and where auxiliary or expansion devices may be connected to the main computer thereby, and where the auxiliary device itself serves as a handle for holding the main computer.

It is still another objective of the present invention to provide a vehicular docking station for the combined main computer and auxiliary unit, which vehicular docking station is provided with a multi-pin connector for receiving thereby a multi-pin connector of the auxiliary unit when the computer is connected to the auxiliary unit, with the vehicular docking station connector being "smart" in detecting and notifying the user of proper and secure connection, with the vehicular docking station having a locking mechanism for safely locking in place the main computer/auxiliary unit device, whereby the computer with auxiliary unit is securely mounted on a vehicular platform above the floor of the vehicle.

The pen-based portable computer for use with a docking station has a central processor and first connector means for coupling the computer to the docking station, which docking station has a second connector means for mating with the first connector means of the computer. The auxiliary unit has a third connector for coupling to the first connector of the computer, and a fourth connector for coupling to the second connector of the docking station, whereby the computer may be connected directly to the docking station, or indirectly to the docking station via the auxiliary unit. The auxiliary unit also has device-coupling means for operatively coupling peripheral devices with the computer so that the computer may access the peripheral devices.

The auxiliary unit has a removable, radio-module means for providing wireless communication to the computer, which removable, radio-module means is connected to the central processor of the computer via the connectors. The removable, radio-module has a transceiver associated with one of the following systems: ARDIS, RAM, GPS, CDPD, Spread Spectrum, and PCS. The auxiliary unit also has first aligning means, and the docking station has second aligning means cooperating with the first aligning means, with the aligning means orienting the pen-based computer and the auxiliary unit relative to the docking station for subsequent locking of the computer to the docking station.

The docking station for receiving and securing the portable computer has a main housing having a front section against which a portable computer is received, securing means for securing a portable computer to the front section of said main housing, a connector projecting from the front section of the main housing for mating with a connector on the portable computer or auxiliary unit in order to establish electrical connection between the central processor of the portable computer and the docking station; and an actuator for actuating the securing means for locking the portable computer to the front section of the main housing. The securing means has a pair of slidable plates that move opposite to each other.

BRIEF DESCRIPTION OF THE DRAWINGS

The invention will be more readily understood with reference to the accompanying drawing, wherein:

FIG. 3 is a partial assembly isometric top view of the completely-assembled, portable pen-based computer for use with a vehicular docking station;

FIG. 4B is an isometric assembly bottom view of the auxiliary, independent expansion unit that is coupled to the portable pen-based computer of FIGS. 1–3 for use with a vehicular docking station;

FIG. 5A is a front assembly view, in isometric, of the vehicular docking station for the combined computer-expansion unit of the invention;

FIG. 5B is a rear assembly view, in isometric, of the vehicular docking station for the combined computer-expansion unit of the invention;

FIG. 8 is a top isometric view of the coupled state of the three main components of the portable pen-based computer of.the invention of FIG. 7; and FIG. 9 is a side isometric view of the coupled state of the three main components of the portable pen-based computer of the invention of FIG. 7.

DETAILED DESCRIPTION OF TEE INVENTION

Figure 1:
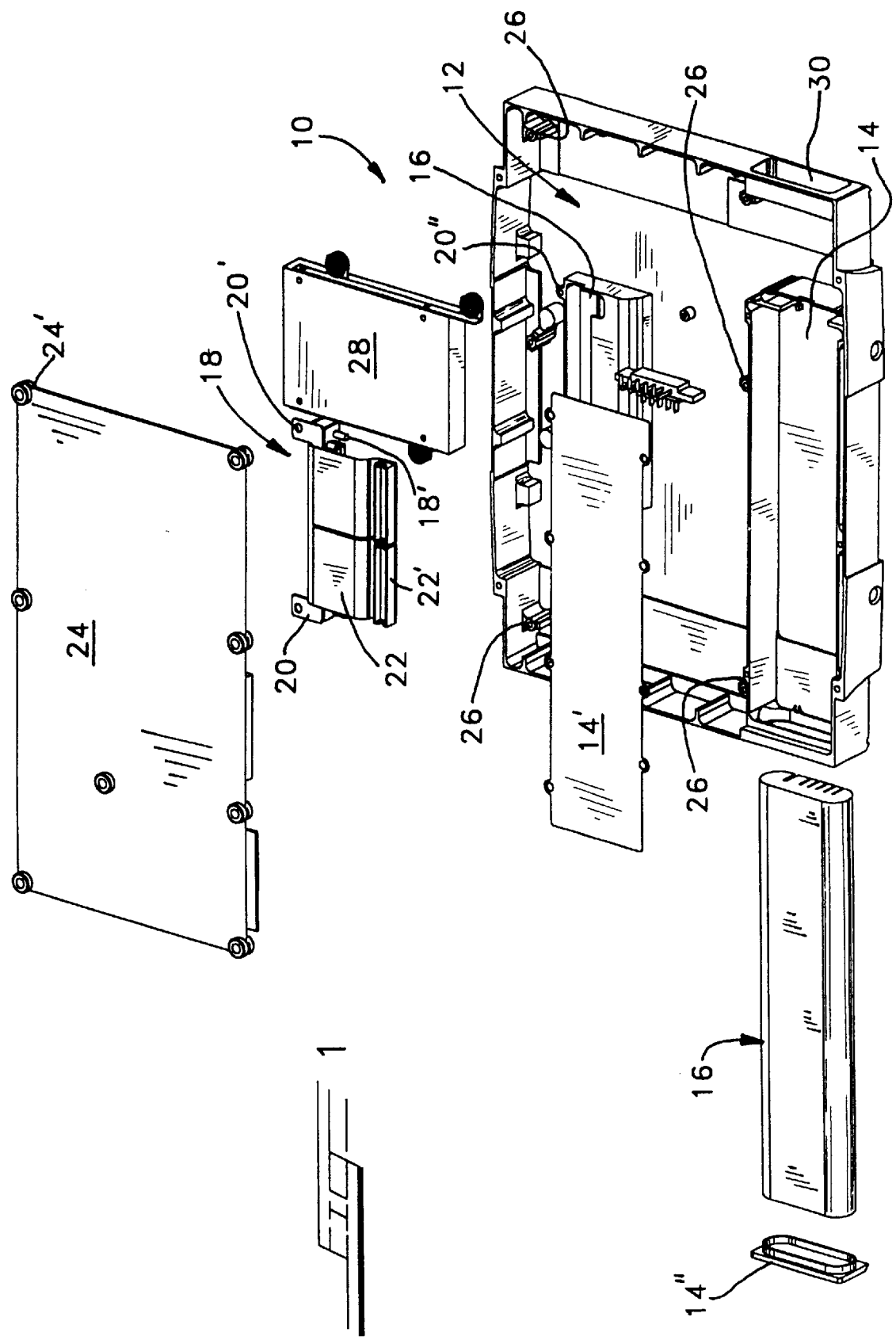
FIG. 1 is an isometric assembly view of the bottom housing of the portable pen-based computer for use with a vehicular docking station.

Referring now to the drawings in greater detail, and to FIGS. 1–3 for now, there is shown the portable, pen-based computer tablet 10 of the invention for use with a vehicular docking station, described hereinbelow. The portable, pen-based computer tablet 10 of the invention has a rear housing-portion 10' shown in FIG. 1, and a front housing-portion 10" shown in FIG. 2, both preferably made of aluminum, or magnesium, in order to provide ruggedness, excellent shielding of electrical transmissions, and for serving as an excellent heat sink to dissipate heat from the core electronics. The rear housing 10' has a main cover, mounting portion 12 which is sectioned into a number of compartments on the interior face thereof that faces toward the front housing of FIG. 2. The first compartment is a battery-mounting compartment 14 for battery pack 16, which battery-mounting compartment 14 has a sheet-metal cover 14' that locks the battery pack in place via screws, whereby the battery pack is prevented from having movement. A removable access cover 14" seals the compartment by means of an O-ring, for preventing dust, moisture, and dirt from entering therein. The second compartment of the main cover, mounting portion 12 is the cutout, docking-port compartment, or cavity 16, which houses therein a 240-pin docking connector 18, which cavity 16 projects rearwardly from the rear wall of the housing 12. The docking connector 18 is preferably an AMP 240-pin, self-wiping connector, which permits PCI bus and AT bus signaling to be passed from the main logic board out to the intermediate, auxiliary expansion unit or to the docking station.The docking connector 18 protrudes rearwardly out from the cavity 16, so that the 240-pin connector projects rearwardly and out from the rear, or exterior, surface of the main cover, mounting portion 12. The docking connector 18 mates with a mating connector provided on the intermediate, auxiliary expansion unit discussed hereinbelow with reference to FIGS. 4A–4C, or, alternatively, may mate directly to the mating connector provided on the vehicular docking station discussed hereinbelow with reference to FIGS. 8 and 9. The docking connector 18 also faces in a vertically-downward direction, such that a mating connector on either the intermediate, auxiliary expansion unit or on the vehicular docking station is mated to it by pushing up the unit having the mating connector into the docking connector 18. Thus, the docking connector 18 projects rearwardly of the rear wall of the rear housing 10' and downwardly. The docking connector 18 is sealed, which provides additional sealing to prevent water, dust and dirt from entering into the housing via the cavity 16. The docking connector 18 is provided with two guide pins 18' which assist the user in guiding the mating connector on the intermediate, auxiliary expansion unit or on the docking station into the docking connector 18, the mating connectors having corresponding through-holes for receiving these guide pins 18'. The rearwardly-projecting cavity 16 also acts a guide to the upward insertion of the mating connector. Once mated, gravity further aids in the positive connection of the vertically-oriented, mating connectors; thus, this vertical coupling of connectors provides an easy yet strong connection not readily broken by accident. The back wall of the cavity 16 is curved, in order to aid in the above-mentioned guiding function provided thereby. The fact that the cavity 16 is recessed into the rear housing 12 provides protection to the docking connector 16 in that the docking connector cannot be bent out of position, since the cavity overlaps the connector like a visor or hood. Since the cavity itself is shaped to provide a guide to the mating connector, prevention of the bending of the connector-pins during mating is substantially achieved. Moreover, since the docking connector is on the rear of the housing 12, and, therefore, on the rear of the computer 10, the computer 10 may be docked to either the intermediate, auxiliary expansion.unit or the docking station while still using the computer, without the need of having to stop work or shut down the computer, as is the case in the prior-art devices. The docking' connector 18 is mounted within the cavity 16 via one-piece, sheet-metal mounting plate 20 having holes 20' that cooperate with holes 20" associated with the cavity 16. Connected to the docking connector 18 is a flexible cable 22, which has at one end thereof connector-portion 22' that connects to the main logic board, described hereinbelow.

The rear housing also mounts the main logic board 24 which provides the core electronics that run the portable, pen-based computer 10. The main logic board components are conventional, and include processor, RAM, run-time clock, I/O signaling and BIOS chipset, and the like. The main logic board 24 is mounted to the rear housing-portion 10' by screws passing through holes 24' in the main logic board 24 and into posts 26 formed in the interior-facing surface of the main cover, mounting portion 12. The main logic board 24 fills most of the interior space of the rear housing-portion 10' not taken up by the battery compartment 14. Mounted on the underside of the main logic board 24 is a hard drive 28, such mounting allowing for better shock absorption and for a direct connection to the circuitry on the main logic board. The hard drive is able to withstand 125 G of shock while operating and 350 G of shock when not operating. The hard drive is supported with shock-absorbing/dispersing foam (not shown) that is seated between the interior-facing wall of the rear housing-portion 10' and the hard drive itself. The final compartment of the rear housing-portion 10' is switch-compartment 30 for an on-off switch, reset switch, and DC power plug. The rear housing-portion 10' is also provided with two guide-pin holes which receive and guide therein guide-pins provided on the docking station, as set forth in greater detail hereinbelow, whereby the portable, pen-based computer tablet 10 may be easily and surely connected to the docking station.

Figure 2:
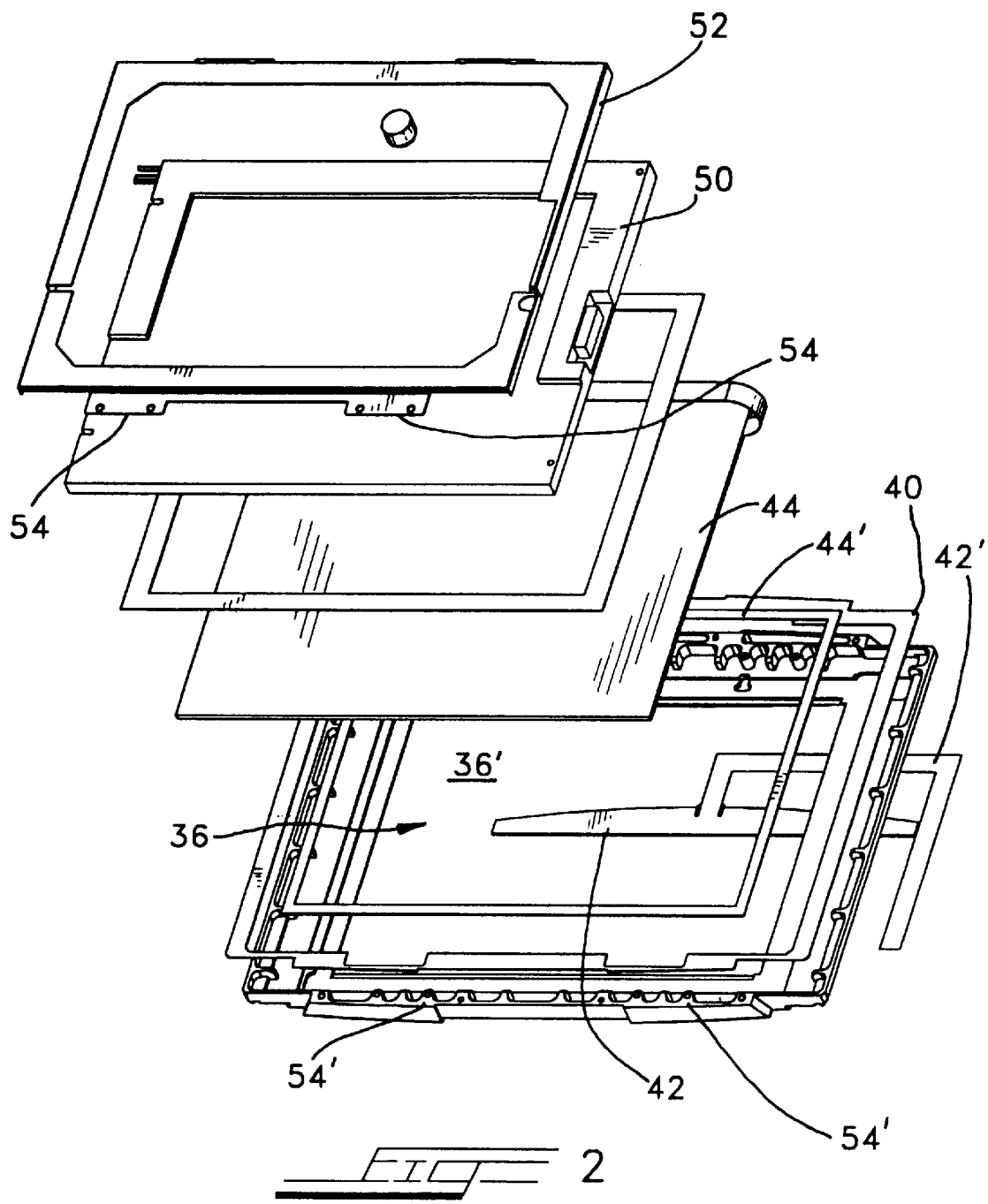
FIG. 2 is an isometric assembly view of the top housing of the portable pen-based computer for use with a vehicular docking station.

Referring now to FIG. 2, the front housing-portion or section 10" is shown. The front housing-portion 10", which is secured to the rear housing-portion 10' by means of brackets shown in FIG. 3, and described hereinbelow, and is made up of a main mounting section or plate 36 having a rearwardly-facing, interior surface 36' to which are mounted other component-parts of the computer 10. The front housing-portion or section 10" is also preferably made of aluminum or magnesium to ensure ruggedness, and to provide excellent shielding of electrical transmissions, and for serving as an excellent heat sink to dissipate heat from the core electronics. Perimetrically surrounding the interior surface 36 of the main mounting section or plate 36 is a seal 40 that is sandwiched between the front and rear housings 10', 10", which provides EMI shielding as well as protection from water, dust and dirt. Attached to the front face of the front housing-portion 10" is a conventional membrane switch-assembly 42, which is a user-interface component that provides status-indicators to the computer-operator. This membrane switch-assembly 42 includes LED indicators for Power ON, hard-drive activity, docking status, brightness and contrast controls for the LCD screen,as well as an automatic setting for screen brightness de-pending upon ambient lighting conditions. The membrane switch-assembly 42 is secured in place the front of the housing-portion 10" via adhesive. A right-angled flexible cable 42' is integrated into the membrane switch-assembly 42 and runs through a small opening or slit formed in the face of the front housing, which cable 42' connects to the main logic board 24 on the rear housing, as described above. Also associated with the front housing is a glass/electrostatic digitizer 44. The electrostatic digitizer is embedded into the glass itself to thus be formed integrally with the glass. The glass/electrostatic digitizer combination 44 serves as the main area for the pen-stylus input. In the prior-art products, the electrostatic digitizer is a separate component below the LCD panel below the glass-layer or screen, with the glass-layer sitting on the LCD panel, thus placing the digitizer two layers below the user-interface, or glass-layer. In the present invention, since the electrostatic digitizer is part of the glass layer itself, there is no separation between pen-stylus input and the electrostatic digitizer component. The electrostatic digitizer 44 is a secured to the undersurface of the front housing by means of digitizer tape 44', which is a double-sided tape that creates a positive seal against water, dust and dirt. Over the electrostatic digitizer 44 is a conventional LCD screen 50 which is secured to the peripheral undersurface of the electrostatic digitizer 44 by means of a double-sided tape, that permits the LCF screen to flex slightly in order to absorb shock and vibrations, and that allows the LC screen to be easily and readily removed when required to replace the digitizer or when upgrading the display panel. The LCD panel is firmly held in place to the front housing by means of bracket 52, which is secured to the front housing 10" by eight a series -of screws passing through holes 54 on the top and bottom of the bracket and through holes 54' on the top and bottom of the main mounting section or plate 36.

Referring to FIG. 3, there is shown the assembly of the portable, pen-based computer tablet 10, with the front housing 10" being secured to the rear housing 10' by means of a plurality of grips or mounting brackets. There are two upper, lateral U-shaped mounting brackets, or grips, 60, 62, and two lower, lateral U-shaped mounting brackets, or grips, 64, 66, each being made of an outer dense-rubber layer 61, that is over-molded onto an interior, sheet-metal layer that acts as a slide. Each mounting bracket or grip slides along the abutting, corresponding lateral edges of the front and rear housings and is guided therein by means of a channel 68 formed in each upper edge-surface of the front housing and channel 68' formed in each lower edge-surface of the rear housing. The front and rear housings, therefore, are secured together without the use of screws, and are easily removed from one another, while being securely and sealingly fastened together when assembled. The brackets serves not only to create the final seal by compressing the seal, or gasket, 40 that is sandwiched between the front and rear housings, as shown and described above with reference to FIG. 2, but also serve as shock-absorbers if the computer 10 is dropped. In addition, each grip 60–66 has a slight convex, outer curvature, so that, if the computer should be dropped, it will land on this convex-shaped part, whereby the impact will be experienced on a narrow line along the convex part, and not on an entire flat surface, thus spreading the shock of the impact throughout the remainder of the grip. As can be seen in FIG. 5, every direction of the computer 10 has a portion of a shock-absorbing grip projecting beyond a corresponding edge-surface of the front and rear housings, whereby when the computer is dropped, only the projecting portion of a grip will contact the floor or ground during impact. The grips 62 and 64 are also replaceable and interchangeable one with another. However, the grip 66 is provided with a cutout 66' for allowing access to the switches provided in the rear housing, as described above with reference to FIG. 1, and, therefore, is not interchangeable with another one. In order to provide shock-absorption to the computer in case of the unlikely event that the grips themselves will not receive the brunt of the shock if the computer should be dropped, upper and lower rubber pads 70, 72 are also provided, with interior sheet-metal slides, as in the construction of the grips. These pads are located along the center of the respective upper and lower edge-surfaces of the front and rear housings, also serve to secure the two housing portions 10', 10" together. Each pad 70, 72 also has a recess or concave cutout 70', 72', along the width of its exterior surface, which serve as guides for docking the computer to a docking station, as discussed in detail hereinbelow with reference to FIG. 8, which docking station has a mating, elongated convex surface that is received in cutout or groove 72' during connection of the computer 10 to the vehicular docking station. This feature is important sine in docking the computer to its vehicular docking station (FIG. 8), such is performed in a blind manner, since the pin connector is located on the rear surface of the rear housing portion, or on the rear surface of the auxiliary expansion unit, as described hereinbelow with reference to FIGS. 4A–4C. Using the guide slot 72' allows for an easy and safe attachment of the computer to the vehicular docking station.

Figure 4A:
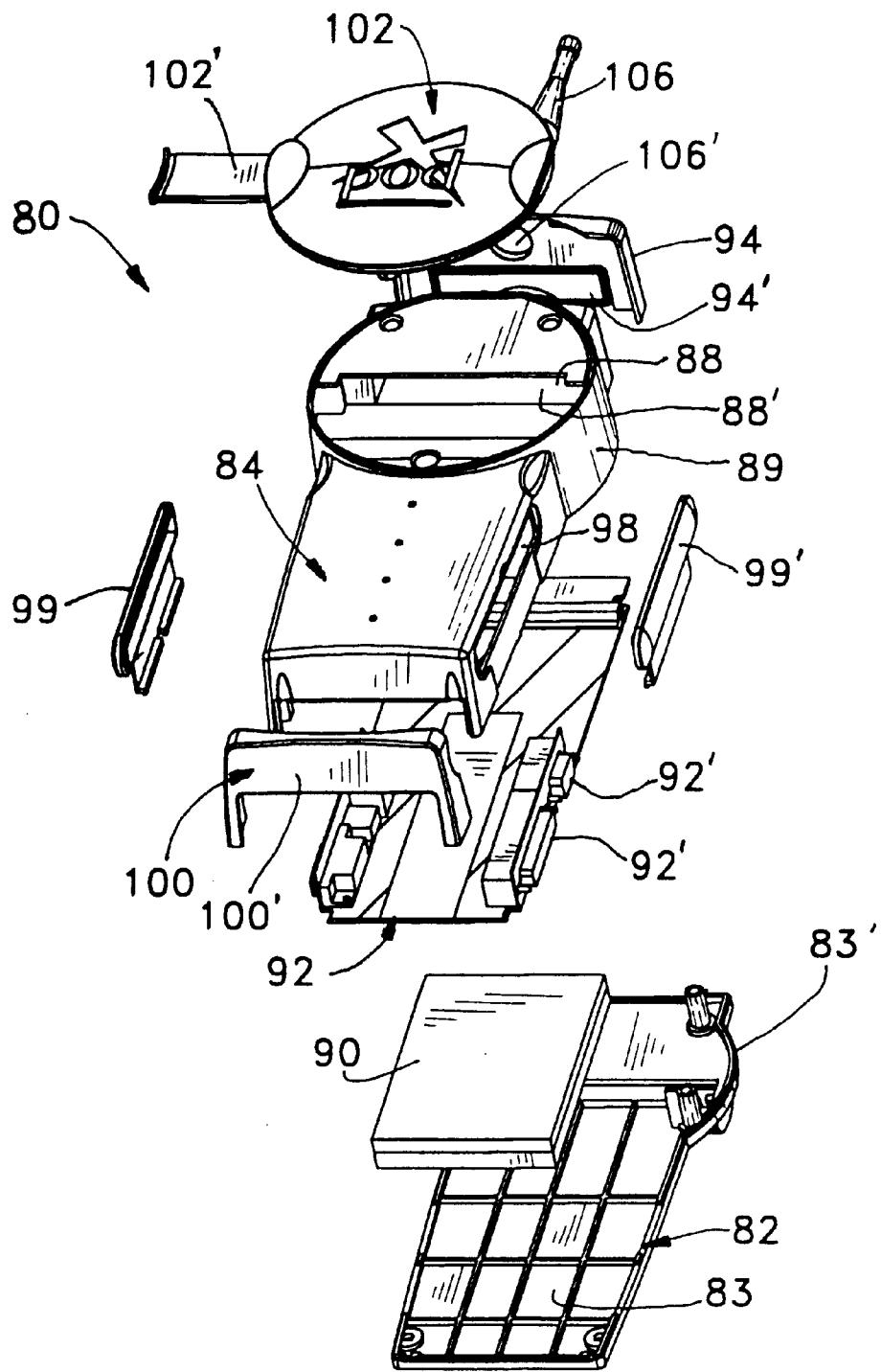
FIG. 4A is an isometric assembly top view of the auxiliary, independent expansion unit that is coupled to the portable pen-based computer of FIGS. 1–3 for use with a vehicular docking station.
Figure 4C:
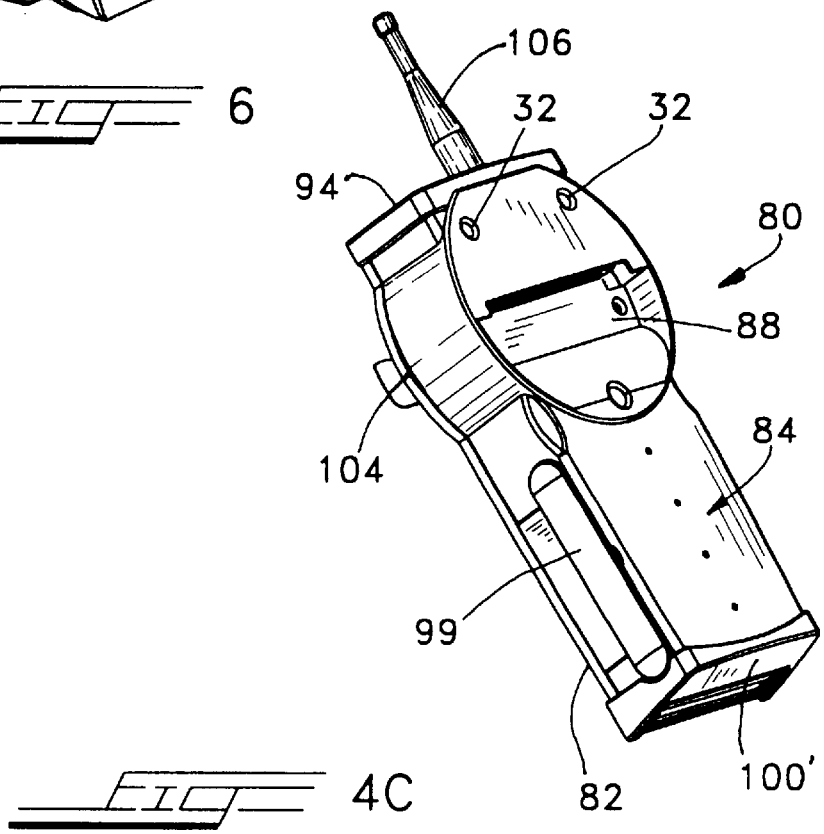
FIG. 4C is an isometric view of the completely-assembled, auxiliary, independent expansion unit that is coupled to the portable pen-based computer of FIGS. 1–3 for use with a vehicular docking station.

Referring now to FIGS. 4A–4C, there is shown the auxiliary expansion unit 80 of the invention. The primary function of this unit is to provide the capability of coupling auxiliary devices to the main pen computer tablet 10, such as standard serial and parallel ports, keyboard port, mouse port, floppy-disk drive connector, and a universal serial bus port, all of which allow for the connection of auxiliary, or peripheral, equipment, such as a printer, modem, keyboard, and the like. The main function of this unit is to provide the capability of adding and/or changing the wireless and GPS systems in the field, without the need of sending the entire computer system back to the manufacturer, as is the case in prior-art systems, and also to serve as a handle for the main pen computer tablet 10. The auxiliary expansion unit 80 has a front housing section 82 and a main rear housing section 84 both made of magnesium. The front housing section 82 acts a cover for the housing section 84, and mounts a 240-pin connector 82' for the mating connector 18 of the main pen tablet computer 10 of FIGS. 1–3 extending from the rear thereof. Since the connector 18 faces downwardly, or is accessed from below, the connector 82' faces upwardly or is accessed from above, thereby allowing the mating connection of the two connectors. The front housing or cover 82 is secured to the main housing section 84 via a plurality of screws passing through holes formed by hollow studs 84 in the front housing section 82, which screws also are received in similar holes in the main rear housing section 84. In between the two housing sections are mounted the operational parts of the auxiliary expansion unit 80 as described hereinbelow. Projecting from the rear surface of the main rear housing section 84 is a recessed cutout 88 which receives another 240-pin connector 88'. The recessed cutout 88 is similar to the recess 16 formed in the rear housing of the pen tablet computer 10 (FIG. 1) for the 240-pin connector 18. Either of the 240-pin connectors 18 or 88' is capable of being coupled to a mating connector formed in the front of the associated vehicular docking station, discussed hereinbelow. The principal element mounted in the auxiliary expansion unit 80 is an easily removable and replaceable, conventional radio module 90, such as that manufactured by RIM Manufacturing Co. This radio module is one of the following types: RAM mobile Data, ARDIS, Global Positioning System (GPS), Cellular Digital Packet Data (CDPD), Spread Spectrum (2.4 GHz.), or Personal Communication Services (PCS) on narrow band channels. Anyone may be replaced with another, in an easy and fast manner, to allow for quick changeover from one kind of system to another. Each radio unit is a self-contained radio transceiver with necessary supporting software, and each is shielded with mylar strips to disperse heat and reduce EFI. The radio module 90 is seated against the interior, or inwardly-facing, surface 83 of the front housing section 82, and is positioned against a portion thereof that is below the section 83' which mates with circular portion 89 of the main rear housing section 84 from which extends the recessed cutout 88 for the connector 88', as best seen in FIG. 4A. Positioned between the radio module 90 and the main rear housing 84 is a conventional printed circuit board (PCB) that houses the core electronics 92. The PCB 92 mounts a number of ports 92', such as a RS232, 9-pin serial port, a 25-pin parallel port, a 6-pin keyboard port, a 5-pin mouse port, a floppy-disk drive connector, and a Universal serial bus port. These ports allow are preferably located on the sides of the PCB 92, and allow for communication with peripherals, such as printers, modems, keyboard, etc. The PCB 92 extends PCI BUS, and also runs Super I/O for serial and parallel controllers. Also, on the top of the PCB 92 there may be provided a PCMCIA card-cage that allows for system-expansion by adding a PCMCIA card, such an integrated radio module different from module 90. Access to the PCMCIA card-cage is provided via a top rubber cover 94, which also provides shock-absorption from knocks and drops of the unit onto the top thereof. The rubber cover 94 also has a hinged door 94' which allows access to the PCMCIA card-cage, and also provides a seal to moisture, dirt and dust. The PCMCIA card-cage is preferably accessible from the top of the unit so that any device installed and connected thereto may be easily and quickly disconnected and removed from the unit. The main rear housing 84 also has slots 98 on either lateral side thereof which allow access to the above-mentioned ports of the PCB 92. These slots 98 are closed off by hinged, port-cover doors 99, 99', which also provide a seal therefor. The bottom of the unit is provided with a bottom, protective rubber foot pad 100 which serves two main functions: It has a 5% grade to its bottom surface 100' which allows the auxiliary expansion unit 80 and attached pen-based computer tablet 10 to be self-standing on a flat surface; and it provides shock-absorption when the unit is bumped or dropped on the bottom portion thereof. Since the radio module 90 is mounted in the auxiliary expansion unit 80, it is extremely important to provide this shock-absorption. In order to protect the docking connector recess 88 and the connector 88' therein when the unit is not in use, there is also provided a cap 102. The cap 102 has a flexible mounting arm 102' that is received in a mounting slot 104 for removably securing the cap to the main rear housing 84. Located next to the PCMCIA card-cage on the top of the unit is a ¼ wave or ½ wave radio antenna 106 for the radio used. The antenna 106 extends through a hole 106' formed in the top cover 94. Finally, a flexible cable assembly 110 is provided which connects the PCB 92 to the main pen-tablet computer 10. The flexible cable assembly 110 is actually made up of two cables: A first for passing PCr and AT bus signals from the main pen-based computer 10 via the 240-pin connector 88'; and a second for passing these same signals from the PCB 92 to the vehicular docking station, described hereinbelow, via the 240-pin connector 82'. These cables are the same as that of the main computer 10, and are AMP connectors.

Figure 6:
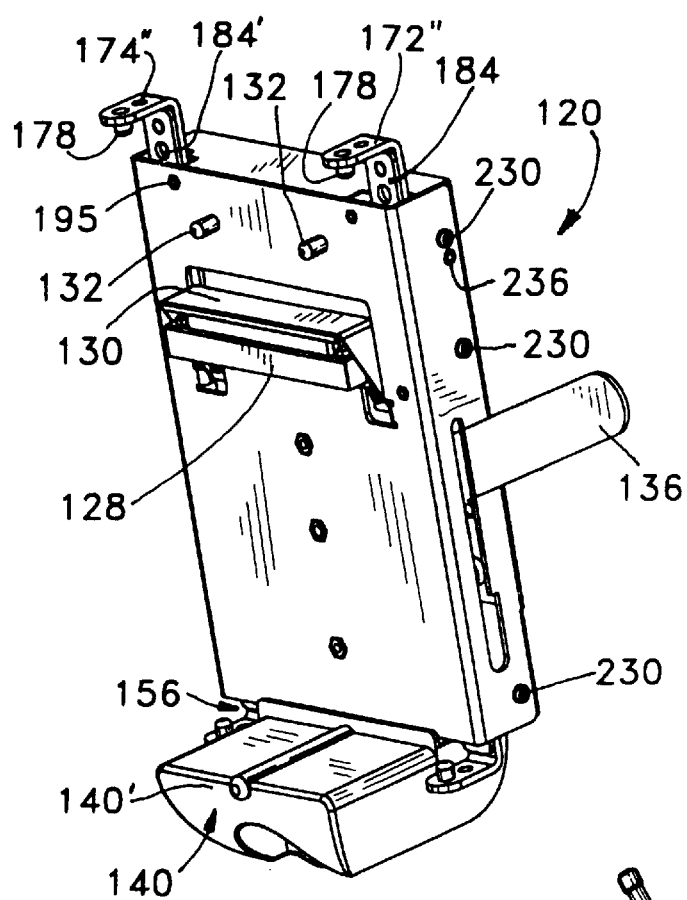
FIG. 6 is a front, isometric view of the assembled, vehicular docking station of FIG. 5.

Turning to FIGS. 5A, 5B and 6, there is shown the vehicular docking station 120 of the invention. The vehicular docking station 120 is capable of coupling directly to either the pen-based computer tablet 10 by itself, or to the auxiliary unit 80 when it is coupled to the pen-based computer tablet 10. The vehicular docking station 120 has a front mounting bracket 122 that is U-shaped in cross section, and defining a front surface-plate 122' with rearwardly-projecting side plates 124, 124'. Formed in the upper portion of the front surface-plate 122' is an opening 126 through which projects a 240-pin mating connector 128 for coupling with either the 240-pin connector 18 of the computer tablet 10 or the 240-pin connector 88 of the auxiliary unit 80. The front plate also mounts a hood or shield 130 that is positioned above the connector 128 when projecting through opening 126, which hood protects the connector from dust, dirt, water, and the like. This protection is important, since the connector 128 opens, or faces, upwardly, which means that dust and dirt or water would easily fall therein if not protected or covered over by the hood 130. The hood 130 is secured to the front surface-plate 122' via screws passing through holes 122" in the front surface-plate. Also projecting from the front surface-plate 122', from the upper surface thereof, is a pair of guide-pins 132 for use in guiding the pen-tablet computer 10, or the combined computer/auxiliary unit, to the docking station, and are received in guide-holes 32 formed in the back of the auxiliary unit 80 (see FIG. 4C), or similar ones on the back of the pen-tablet 10. These guide-pins 132 provide positive reinforcement for docking between the pad and the docking station, and are coated with rubber, so that they do not mar the back of a unit. The side plate 122 is provided with an elongated cutout or slot 134 through and in which projects and slides a clamping lever-arm 136, which lever-arm is used for clamping and unclamping the pen-tablet or combination pen-tablet and auxiliary unit to and from the docking station. The lever-arm 136 is pivotally mounted within the volume between the two side plates 124, 124' in the manner described hereinbelow. The slot 134 has a detent 134' that divides the slot into an upper section and a lower section. When the lever-arm 136 is positioned in the lower section of the slot, in which position the pen-tablet computer is locked in place to the docking station, the detent 134' prevents any accidental movement of the lever-arm from this lower position, whereby accidental unlocking of the pen-tablet computer to the docking station is prevented. Thus, to position the lever-arm in either the upper or lower section, one must first move the lever-arm forwardly to clear the detent 134'. Mounted to the bottom edge-surface of the front surface-plate is a base-pad 140, which has a plastic upper surface on a metal base. This upper, plastic surface is provided with a convex-shaped runner or guide 140' for mating with cutout or groove 72' formed in the bottom-edge of the housing of the pen-tablet 10 (FIG. 3), so that, during connection of the computer 10, with or without attached auxiliary unit, to the vehicular docking station, one may feel the positive mating therebetween to ensure proper positioning. The base pad 140 is contoured to be rounded along its edges in order to allow one to rest his foot thereon, since the docking station is mounted to a pedestal extending from the floor of a vehicle. The base pad is also capable of housing a key-lock assembly that prevents removal of the pen-tablet computer until unlocked. The base pad is secured to the front surface-plate by means of a yoke 142 projecting forwardly from the bottom surface of the front surface-plate 122', which yoke has a downwardly-projecting connecting plate 142' with hole 143. The base pad 140 has a pair of rearwardly-projecting side walls 141 that are spaced a distance apart that allows them to overlap the legs of the yoke 142 when the base pad is assembled to the mounting plate 122. The base pad 140 also has a rearwardly-projecting connecting arm 144 medially of the two side plates 141, frog the end of which projects upwardly an upright arm 144' having a hole 145 formed therein that corresponds to the hole 143 of the yoke 142. The rearwardly-projecting connecting arm 144 is preferably made of two, spaced-apart, parallel legs, so as define a space therebetween, through which space may pass a screw or bolt that fastens the yoke 142 to the upright arm 144' via the holes 143, 145. A transverse, upwardly-projecting lip 147 on the upper surface of the base pad 140 abuts against the lower portion of the front surface-plate 122' when the base pad is attached to the front mounting plate 122, as can be seen in FIG. 6.

Mounted between the two side plates 124, 124' of the mounting bracket 122 are the operating parts of the docking station for electrically coupling the pen-tablet 10 thereto, and for locking the pen-tablet in place. The first part is a sliding, docking-connector, mounting plate 150. To the upper edge-surface 150' of the mounting plate 150 is secured a conventional, floating, 240-pin docking connector 128, which is supported on the edge-surface 150' by a sheet-metal bracket. As stated above, this connector 128 opens or is connectable from above, for mating with the conventional, mating, 240-pin connectors on the pen-tablet computer or auxiliary unit 80, whose connectors open or are Connectable from below. The mounting plate 150 slides is mounted for sliding movement, as described hereinbelow, such that it slides upwardly when the lever arm 136 is pulled downwardly, for positioning the connector 128 in the downwardly-facing mating connector of the pen-tablet computer or auxiliary unit 80. To release the connector 128, the lever arm is slide up, whereby the mounting plate 150 is moved downwardly to move the connector 128 away from its mating connector. The connector 128 projects outwardly through the opening, or cutout, 126 formed in the front surface-plate 122', as can bee seen in FIG. 6. Mounted to the lower edge of the sliding plate 150 is a lower pair of L-shaped brackets 156, each having a vertical leg-section 156' and a horizontal leg-section 156". The vertical leg-section 156' is provided with a hole 159 and a mounting pin 158'. The sliding plate 150 has a pair of downwardly projecting mounting ears 158 each having a lower projecting pin 161 that is received in a hole 159 aligned therewith in the vertical leg-section 156' for mounting the bracket 156 to the plate 150. Each ear also has an upper hole 161' for the purpose to be described below. The sliding plate 150 also has holes 160 for receiving the mounting pins 158' therethrough. The forward end of the horizontal leg-section 156" of each bracket 156 is also provided with a mounting pin 166. These mounting pins are received in guide-holes 33 formed in the bottom of the pen-tablet computer's housing, as seen in FIG. 3, which also serve the purpose of clamping the pen-tablet computer to the docking station when the lever arm 136 is slid downwardly, as described hereinbelow. The brackets 156 may be fastened to the sliding plate 150 in one of two ways, where in the first position shown in FIG. 6, the brackets 156 mount the pen-tablet computer to the docking station without the auxiliary unit 80 attached. In this case, the shorter horizontal legs 156" are used as shown in FIG. 5, and project outwardly a short distance so as to mate with the guide-holes 33 of the pen-tablet computer. However, when the auxiliary unit 80 is attached to the pen-tablet computer 10, which means that the guide-holes 33 are spaced farther from the front surface-plate 122', the brackets 156 are inverted so that the vertical leg section 156' now becomes the horizontal section, and the horizontal section 156" now becomes the vertical section. In this case, with the pen-tablet computer attached to the auxiliary unit 80, each pin 166 is received in an upper hole 161" of a mounting ear 158, with a pin 161 of an ear 158 being received in a hole 157 of a leg-section 156". In this position, the pins 158' of the leg-sections 156' serve as the mounting pins for reception in the holes 33 of the pen-tablet computer 10.

Figure 7:
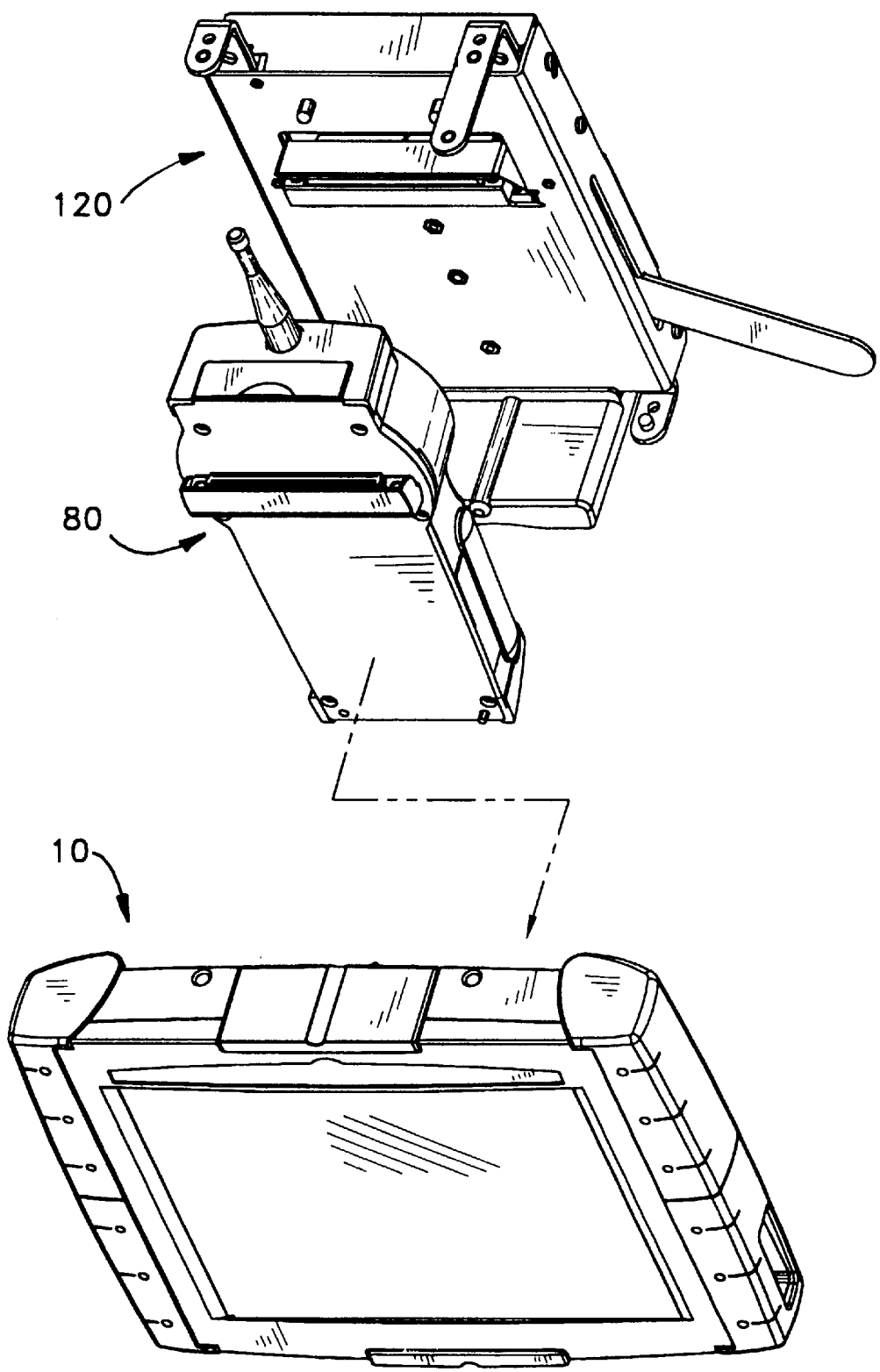
FIG. 7 is an isometric assembly view showing the three main components of the portable pen-based computer, the pen-based computer, the expansion unit, and the docking station to which the combined computer-expansion unit is coupled for use in a vehicle.

The vehicular docking station 120 also has a second sliding plate which is mounted to slide in the opposite direction as that of the first sliding plate 150; that is, when the locking lever arm 136 is slid downwardly, the first sliding plate 150 is slid upwardly to lock the 240-pin connector 128 to the mating connector of the pen-tablet computer 10 or auxiliary unit 80, while this second sliding plate is slid downwardly along with the locking lever arm 136. This second sliding plate 170 is used to firmly clamp the pen-tablet computer with or without the auxiliary unit 80 to the docking station by means of clamping arms 172, 174. These clamping arms 172, 174 are similar to the brackets 156 on the lower edge of the first sliding plate 150, as described above in detail. Each clamping arm 172, 174 has a vertical leg section 172', 174' and a horizontal leg section 172", 174" in which each of which is formed a hole 176 and a projecting bead or pin 178. Each vertical leg section also has an upper hole 180 and a lower protruding bead or pin 182. The upper edge-surface of the second sliding plate 170 has a pair of upwardly-projecting, spaced-apart mounting ears 184 each having a lower hole 184' and an upper inwardly-projecting bead or pin 186. The use of the clamping arms 172, 174 is the same as that of the lower brackets 156 of the first sliding plate. When the pen-tablet computer 10 is mounted directly to the docking station 120 without the auxiliary unit 80, the clamping arms are mounted as shown in FIG. 6, with the bead or pins 186 received in holes 180 of the vertical leg sections, and with each lower bead or pin 182 being received in a respective slot 171 formed in the lateral side surfaces of the second sliding plate. The downwardly-projecting bead or pins, or tabs, 178 are received in the guide-holes 31' in the upper edge-surface of the pen-tablet computer's housing (see FIG. 9). After the tabs have been aligned above the holes 31', then the second plate is slid down via the locking arm 136, whereby the pen-tablet computer is locked to the docking station via the entry of the tabs 178 into the holes 31'. In the case where the pen-tablet computer is joined to the auxiliary unit 80, then the clamping arms 172, 174 are inverted, whereby the horizontal leg sections now become the vertical and the vertical leg sections now become the horizontal. In this case, as can be seen in FIG. 7, the tabs 178 are received in holes 184' of the mounting ears 184, and the tabs or bead or pins 186 received in the holes 176 of the horizontal leg sections, with the vertical leg sections 172', 174' now projecting horizontally outwardly from the front surface-plate 122' a distance greater enough so as to be aligned above the holes 31' of the combined-thickness pen-tablet computer with auxiliary unit 80. The second sliding plate 170 also has a rectangular cutout 190 through which passes a cable-connector described hereinbelow. The two sliding plates 150, 170 are mounted for vertical, sliding motion by means of vertical slots 186 in plate 160 and vertical slots 188 in the plate 170, with tie-rods 189 passing through respective pairs of vertical slots 186, 188 for securing the plates to the front mounting bracket 122. Washer or spacers (see FIG. 6B) space the two vertically-sliding plates apart. A screw 139" passes through a slot 190 in the upper portion of the first sliding plate and is received in hole 139 of the second sliding plate, whereby the two sliding plates are kept spaced apart from each other yet have relative vertical sliding movement.

Positioned rearwardly of the rear surface of the second sliding plate 170 is a printed circuit board 191 for the dock head. The PCB 191 houses the core electronics of the docking station. It is similar to the PCB of the auxiliary unit 80, but does not have native I/O connectors mounted to it. Rather, these I/O connectors are located in a break-out box (not shown) which is capable of being mounted anywhere in the vehicle. The break-out box will have the following I/O ports: three RS-232, 9-pin connectors; one DB25 parallel connector; one keyboard, 6-pin mini-din connector; one mouse, 6-pin connector; one universal serial BUS connector; one VGA, 15-pin connector; one floppy disk drive connector; and one SCSI connector. The PCB 191 pass all of the signals necessary for coupling the ports to the pen tablet computer or auxiliary unit 80. A Samtec connector 193 provides the interface between the flex-cable assembly and the PCB 191 for connection of the PCB 191 to the other main control units of the pen-tablet computer 10 and auxiliary unit 80. The connector 193, with attached cable, are received through the cutout 190 of the second sliding plate 170, as discussed above. The PCB 191 is mounted to the assembly by means of screws 195 passing the upper holes in the mounting bracket 122 and through upper corner holes 1951 formed in the upper portion of the PCB 191, which screws pass between the upright ears 184 of the second sliding plate.

Mounted rearwardly of the two sliding plates 150, 170 and the PCB 191 is the locking lever arm 136, that is fabricated from sheet metal with a coating of rubber. The lever arm has a mounting base-portion 136' having a hole 137 through which passes pivot pin 136". The pivot pin 136" passes through center slot 187 in the first sliding plate 150, through center slot 187' in the second sliding plate, and through the hole 137. A circular disk or spacer 192, having approximately the same diameter as the mounting portion 136' having a central hole 192' also through which passes the pivot pin 136" spaces the lever arm from the second sliding plate and PCB 191. AS explained above, the two sliding plates 150, 170 are slid in opposite, vertical directions; the first sliding plate 150 is slid upwardly when the lever arm is slid downwardly, in order to raise the floating, 240-pin connector for mating with the similar connector on the pen-tablet computer or auxiliary unit 80. When the lever arm is rotated downwardly, the second sliding plate 170 is also slid vertically downwardly in order to lower the clamping arms 172, 174 into the vertically-aligned holes 31' of the pen-tablet computer, whereby the pen-tablet computer is locked securely in place to the docking station. This opposite, vertical motion of the two sliding plates is achieved via connecting links 200, 202. The first connecting link 202 has a lower transverse end 202' which is received in a hole 204 of rearwardly-projecting, lower, medially-located, L-shaped bracket 206 which has a width great enough such that the upright, vertical section of the bracket 206 is located rearwardly of the lever arm 136. Thus, the transverse end 202' projects rearwardly for reception in the hole 204. The connecting link 202 is received interiorly in the L-shaped bracket 206, with the transverse end 202' turning inwardly for reception in the hole 204. The upper end 203 of the first connecting link 202 is connected to the mounting base-portion 136' on the rearwardly-facing surface thereof, and on the lateral side of the pivot hole 137 thereof opposite to that from which extends the lever arm proper. The upper end 203 has a pin or tab that is received in a receiving hole formed in the mounting base-portion 136', as can be seen in Fig. 5A. Thus, when the lever arm 136 is rotated in the clockwise direction when viewing FIG. 5A, it will be moved downwardly, whereas the first connecting arm 202 and, therefore, the first sliding plate 150, will move vertically oppositely, namely in the vertically upward direction. The end-pins 202' and 203 are capable of rotational movement in their respective receiving holes in order to accommodate the relative movement between the lever arm 136 and the first sliding plate 150. The second sliding plate 170 receives conjoint vertical motion with the lever arm 136 by means of the second connecting rod or link 200 that extends along the front surface-face of the lever arm 136. The second connecting link 200 has a lower transverse end terminating in a pin 210 that is received in a hole formed in the front surface of the lever arm on the lateral side opposite to that which the pin 203 is connected, whereby the same vertical motion is imparted to the second sliding plate 170 as that of the lever arm 136. The second connecting link has an upper transverse end terminating in a forwardly-facing connecting pin 212 that is screwed, or otherwise secured, to the screw 139" passing through the slot 190 in the first sliding plate and through the hole 139 in the second sliding plate. All of the transverse ends of the connecting links 200, 202 may be mounted to their respective holes via screws, or the like. It is noted that the vertical slot 190 in the first sliding plate allows for the screw 139" adequate freedom of vertical movement or lost motion, so that the two sliding plates are each free for its respective, independent, vertical, sliding movement.

The docking station is closed off from the rear by a rear backing plate 220, which has a pair of wing plates 222 having holes 224 for matching holes 226 in the side plates 124, 124' of the front U-shaped mounting bracket 122, whereby screws 230 passing through these holes fasten the rear backing plate 220 to the front bracket 122. To aid in the assembly of the rear plate 220 to the front plate, the upper portion of each wing plate 22 is provided with a channel-guide 232 which receives a transverse location-pin 236 provided in each side plate 124, 124' of the front U-shaped bracket 122. FIGS. 7–9 show the assembled pen-tablet computer 10, auxiliary unit 80 mounted to the docking station. It is to be noted that the docking station is mounted to the top of a pedestal in the vehicle, which pedestal is well-known and used by other, prior-art systems.

While a specific embodiment of the invention has been shown and described, it is to be understood that numerous changes and modifications may be made therein without de-parting from the scope, spirit and intent of the invention as set forth in the appended claims.

What we claim is:

1. In a portable computer for use with an hand-held auxiliary unit, said compute r having a central processor and first connector means for coupling said computer to said auxiliary unit, said auxiliary unit having a second connector means for coupling with said first connector means of said computer , the method comprising:

a) securing said auxiliary unit to said computer via said first and second connectors;

b) electrically coupling at least one peripheral device to the central processor of the portable computer;

c) said step (b) comprising connecting the at least one peripheral device to the auxiliary unit, whereby the connection between said first and second connectors couples the central processor of the computer to the at least one peripheral device associated with the auxiliary unit;

(d) said step (b) comprising coupling a removable, interchangeable radio-module unit, whereby the portable computer may transmit via a radio link; and (d) removing the radio module of said step(d), and performing said stop (b) a second time for a different radio module operating on a system that is different the system of the replaced module of said step (d).

2. The method according to claim 1, further comprising removing the auxiliary unit with attached portable computer from the docking station;

removing the auxiliary unit from the portable computer; and securing the portable computer directly to the docking station.

3. In a portable computer for use with an hand-held auxiliary unit, said computer having a central processor and first connector means for coupling said computer to said auxiliary unit, said auxiliary unit having a second connector means for coupling with said first connector means of said computer, the method comprising:

a) securing said auxiliary unit to said computer via said first and second connectors;

b) electrically coupling at least one peripheral device to the central processor of the portable computer;

c) said step (b) comprising connecting the at least one peripheral device to the auxiliary unit, whereby the connection between said first and second connectors couples the central processor of the computer to the at least one peripheral device associated with the auxiliary unit;

said step (b) comprising coupling at least one of the following: printer, keyboard, mouse, floppy-disk drive, CD ROM drive; and further comprising securing the auxiliary unit with attached portable computer to a docking station.

\* \* \* \* \*